US009128550B2

(12) United States Patent
Imada et al.

(10) Patent No.: US 9,128,550 B2
(45) Date of Patent: Sep. 8, 2015

(54) INFORMATION PROCESSING DEVICE (75) Inventors: Yoshiyuki Imada, Chiba (JP); Arito Mochizuki, Tokyo (JP); Tomoya Kitayama, Tokyo (JP); Phillip Profitt, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 0 days.

(21) Appl. No.: 13/825,242

(22) PCT Filed: Aug. 11, 2011

(86) PCT No.: PCT/JP2011/068355
§ 371 (c)(1),
(2), (4) Date: Mar. 20, 2013

(87) PCT Pub. No.: WO2012/043079
PCT Pub. Date: Apr. 5, 2012

(65) Prior Publication Data
US 2013/0181930 A1  Jul. 18, 2013

(30) Foreign Application Priority Data

Sep. 27, 2010  (JP) ................. 2010-215845

(51) Int. Cl.
G06F 3/041  (2006.01)
G06F 1/16  (2006.01)
G06F 3/0488  (2013.01)

(52) U.S. Cl.
CPC ............... *G06F 3/041* (2013.01); *G06F 1/169* (2013.01); *G06F 1/1643* (2013.01); *G06F 3/04883* (2013.01); *G06F 2203/04808* (2013.01)

(58) Field of Classification Search
CPC ..... G06F 1/1626; G06F 1/169; G06F 1/1643; G06F 3/04883; G06F 3/0488; G06F 3/041; G06F 2203/04808
USPC .......................... 345/156, 169, 173, 176, 178
See application file for complete search history.

(56) References Cited

U.S. PATENT DOCUMENTS 7,088,342 B2 * 8/2006 Rekimoto et al. ............ 345/169
7,123,243 B2 * 10/2006 Kawasaki et al. ............ 345/173
(Continued)

FOREIGN PATENT DOCUMENTS

EP  2 187 291  5/2010
JP  2007-141029 A  6/2007
(Continued)

OTHER PUBLICATIONS

International Preliminary Report on Patentability and Written Opinion of the International Searching Authority dated Apr. 25, 2013, from corresponding International Application No. PCT/JP2011/068355.
(Continued)

*Primary Examiner* — Lun-Yi Lao
*Assistant Examiner* — Peter D McLoone
(74) *Attorney, Agent, or Firm* — Katten Muchin Rosenman LLP (57) ABSTRACT Provided is an information processing device which allows a user to provide, regardless of a position or direction of a touch sensor, an operation input to the touch sensor at an arbitrary position or in an arbitrary direction. The information processing device includes two touch sensors each including a detection surface for detecting a position of an object thereon, the two touch sensors being arranged to be opposed to each other, determines at least one of a reference point and a reference axis based on one or a plurality of positions detected by one touch sensor of the two touch sensors, and evaluates a content detected by another touch sensor of the two touch sensors based on the at least one of the determined reference point and the determined reference axis to determine a content of an operation input of a user.

7 Claims, 3 Drawing Sheets

(56) References Cited

U.S. PATENT DOCUMENTS

| | | | |
|---|---|---|---|
| 7,307,623 B2 | 12/2007 | Enomoto | |
| 7,324,093 B1* | 1/2008 | Gettemy et al. | 345/173 |
| 7,800,592 B2* | 9/2010 | Kerr et al. | 345/173 |
| 7,936,341 B2* | 5/2011 | Weiss | 345/173 |
| 8,232,990 B2* | 7/2012 | King et al. | 345/419 |
| 8,259,083 B2* | 9/2012 | Kim | 345/173 |
| 8,269,729 B2* | 9/2012 | Han et al. | 345/173 |
| 8,368,653 B2* | 2/2013 | Han et al. | 345/173 |
| 8,451,268 B1* | 5/2013 | Reisman et al. | 345/419 |
| 8,456,466 B1* | 6/2013 | Reisman et al. | 345/419 |
| 8,493,364 B2* | 7/2013 | Charlier et al. | 345/176 |
| 8,654,104 B2* | 2/2014 | Reisman et al. | 345/175 |
| 8,674,948 B2* | 3/2014 | Han et al. | 345/173 |
| 8,696,471 B2* | 4/2014 | Sakakibara et al. | 463/46 |
| 2003/0184528 A1* | 10/2003 | Kawasaki et al. | 345/173 |
| 2003/0234768 A1* | 12/2003 | Rekimoto et al. | 345/169 |
| 2006/0197750 A1* | 9/2006 | Kerr et al. | 345/173 |
| 2007/0188450 A1* | 8/2007 | Hernandez et al. | 345/158 |
| 2008/0180404 A1* | 7/2008 | Han et al. | 345/173 |
| 2008/0180405 A1* | 7/2008 | Han et al. | 345/173 |
| 2008/0180406 A1* | 7/2008 | Han et al. | 345/173 |
| 2008/0297482 A1* | 12/2008 | Weiss | 345/173 |
| 2010/0020034 A1* | 1/2010 | Kim | 345/173 |
| 2010/0164904 A1 | 7/2010 | Kim et al. | |
| 2010/0277439 A1* | 11/2010 | Charlier et al. | 345/176 |
| 2011/0090155 A1* | 4/2011 | Caskey et al. | 345/173 |
| 2011/0164029 A1* | 7/2011 | King et al. | 345/419 |
| 2012/0188694 A1* | 7/2012 | Sakakibara et al. | 361/679.01 |
| 2013/0100049 A1* | 4/2013 | Mochizuki et al. | 345/173 |
| 2013/0100050 A1* | 4/2013 | Profitt et al. | 345/173 |
| 2013/0100051 A1* | 4/2013 | Mochizuki et al. | 345/173 |
| 2013/0139079 A1* | 5/2013 | Kitao et al. | 715/764 |
| 2013/0307827 A1* | 11/2013 | Reisman et al. | 345/175 |

FOREIGN PATENT DOCUMENTS

| | | |
|---|---|---|
| JP | 2009-187290 A | 8/2009 |
| WO | 2009/031214 A1 | 3/2009 |

OTHER PUBLICATIONS

International Search Report dated Nov. 8, 2011, from the corresponding International Application No. PCT/JP2011/068355.

Chinese First Office Action dated Apr. 29, 2015 from corresponding Application No. 201180046427.X.

* cited by examiner

INFORMATION PROCESSING DEVICE

TECHNICAL FIELD

The present invention relates to an information processing device for receiving an operation input provided by a user, a method of controlling the information processing device, and an information storage medium having stored thereon a program for controlling the information processing device.

BACKGROUND ART

Various methods of providing an operation input to an information processing device by a user have been proposed. One of the methods uses a touch sensor capable of detecting a position of an object (such as a finger of the user or a stylus) on a detection surface (see, for example, Patent Literature 1). By using the touch sensor, the user may realize the operation input to the information processing device by performing actions of, for example, placing a finger on the detection surface or moving the finger on the detection surface.

In this case, the information processing device receives the position of the object or a moving direction of the object on the detection surface as the operation input by the user. The position and the moving direction of the object are acquired as a position and a direction with respect to the touch sensor itself. In other words, the position of the object is evaluated as an absolute position in the detection surface of the touch sensor, and the moving direction of the object is evaluated as an inclination with respect to a reference axis set in the detection surface of the touch sensor. Therefore, the user needs to provide the operation input at such a position that the detection surface comes in front of the user while, for example, confirming the position and the direction of the detection surface of the touch sensor with his/her eyes.

CITATION LIST

Patent Literature

[Patent Literature 1] U.S. Pat. No. 7,307,623 B2

SUMMARY OF INVENTION

Technical Problem

The present invention has been made in view of the above-mentioned situation, and an object of the present invention is therefore to provide an information processing device which allows a user to provide, regardless of a position or direction of a touch sensor, an operation input to the touch sensor at an arbitrary position or in an arbitrary direction, a method of controlling the information processing device, and an information storage medium having stored thereon a program for controlling the information processing device.

Solution to Problem

An information processing device according to the present invention includes: two touch sensors each including a detection surface for detecting a position of an object thereon, the two touch sensors being arranged to be opposed to each other; reference determination means for determining at least one of a reference point and a reference axis based on one or a plurality of positions detected by one touch sensor of the two touch sensors; and operation input determination means for evaluating a content detected by another touch sensor of the two touch sensors based on the at least one of the reference point and the reference axis, which is determined by the reference determination means, to determine a content of an operation input of a user.

In the information processing device, the reference determination means may be configured to determine the reference axis and positive and negative directions thereof based on three or more positions detected by the one touch sensor, and the operation input determination means may be configured to determine a direction indicated by the user as a direction relative to the positive and negative directions of the reference axis from the content detected by the another touch sensor.

Further, the information processing device may further include reference sensor determination means for determining one of the two touch sensors as a reference sensor to be used in determining the at least one of the reference point and the reference axis, and the reference determination means may be configured to determine the at least one of the reference point and the reference axis based on one or a plurality of positions detected by the reference sensor.

Further, the information processing device may further include state transition means for determining a transition to an operation input state using a reference sensor based on a detection result of at least one of the two touch sensors, the reference determination means may be configured to determine the at least one of the reference point and the reference axis in the operation input state using the reference sensor, and the operation input determination means may be configured to evaluate, in the operation input state using the reference sensor, the content detected by the another touch sensor based on the at least one of the reference point and the reference axis.

Further, a method of controlling an information processing device according to the present invention, the information processing device being connected to two touch sensors each including a detection surface for detecting a position of an object thereon, the two touch sensors being arranged to be opposed to each other, includes: a reference determination step of determining at least one of a reference point and a reference axis based on one or a plurality of positions detected by one touch sensor of the two touch sensors; and an operation input determination step of evaluating a content detected by another touch sensor of the two touch sensors based on the at least one of the reference point and the reference axis, which is determined in the reference determination step, to determine a content of an operation input of a user.

Further, a computer readable information storage medium according to the present invention has stored thereon a program for controlling a computer, which is connected to two touch sensors each including a detection surface for detecting a position of an object thereon, the two touch sensors being arranged to be opposed to each other, to function as: reference determination means for determining at least one of a reference point and a reference axis based on one or a plurality of positions detected by one touch sensor of the two touch sensors; and operation input determination means for evaluating a content detected by another touch sensor of the two touch sensors based on the at least one of the reference point and the reference axis, which is determined by the reference determination means, to determine a content of an operation input of a user.

DESCRIPTION OF EMBODIMENT

An embodiment of the present invention is described below in detail with reference to the accompanying drawings.

Figure 1A:
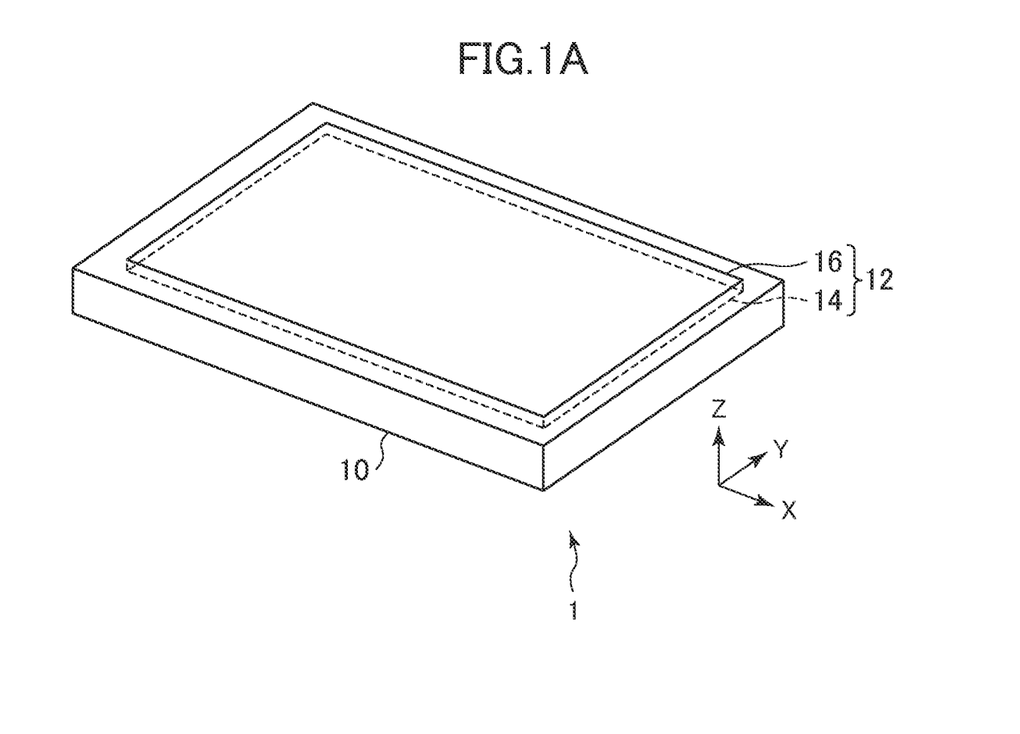
FIG. 1A A perspective view illustrating an appearance of an information processing device according to an embodiment of the present invention.
Figure 1B:
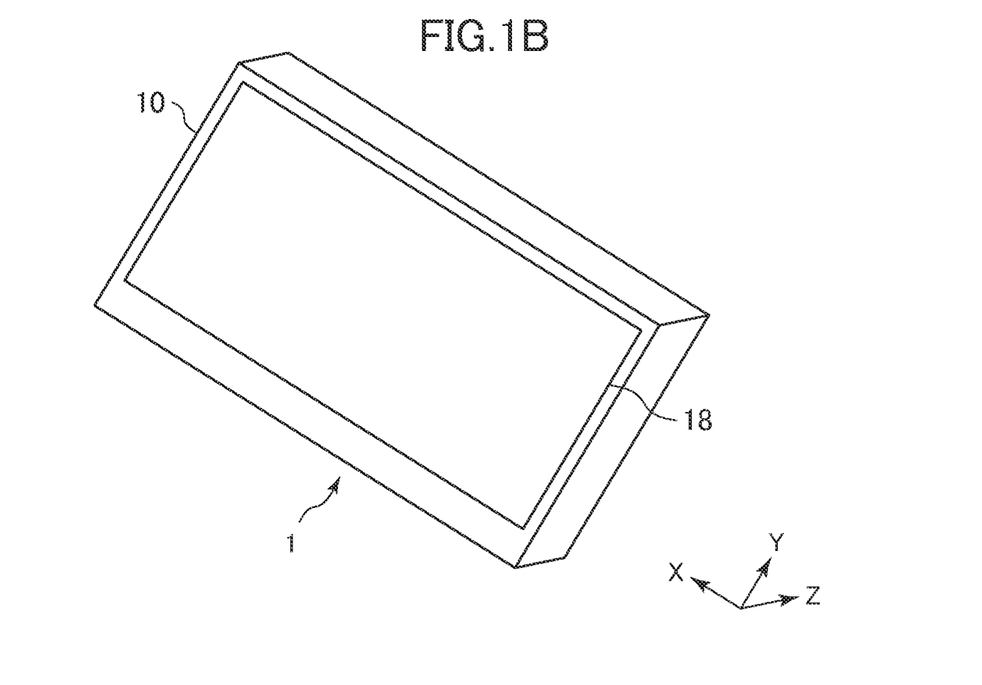
FIG. 1B A perspective view of the appearance of the information processing device according to the embodiment of the present invention.

FIGS. 1A and 1B are perspective views each illustrating an appearance of an information processing device 1 according to an embodiment of the present invention, of which FIG. 1A illustrates the information processing device 1 when viewed from a front side, and FIG. 1B illustrates the information processing device 1 when viewed from a rear side. The information processing device 1 according to this embodiment is, for example, a portable device such as a portable game machine.

As illustrated in the figures, a casing 10 of the information processing device 1 has a substantially rectangular plate shape as a whole. In the following, a horizontal direction (width direction), a vertical direction (height direction), and a thickness direction (depth direction) of the casing 10 are referred to as an X-axis direction, a Y-axis direction, and a Z-axis direction, respectively.

A touch panel 12 is provided on a front surface of the casing 10. The touch panel 12 has a substantially rectangular shape and includes a display 14 and a front touch sensor 16. The display 14 may be various kinds of image display devices, such as a liquid crystal display panel and an organic EL display panel.

The front touch sensor 16 is overlaid on the display 14 and includes a substantially rectangular detection surface having a shape and a size corresponding to a display surface of the display 14. When an object such as a finger of a user or a stylus is brought into contact with the detection surface, the front touch sensor 16 detects a contact position of the object. Note that, the front touch sensor 16 does not necessarily need to detect the position of the object only when the object is brought into contact with the detection surface, but may detect a position of an object with respect to the detection surface when the object approaches enough to be within a detectable range above the detection surface. Further, the front touch sensor 16 may be of any kind as long as the device may detect the position of the object on the detection surface, for example, a capacitive touch sensor, a pressure-sensitive touch sensor, or an optical touch sensor. Note that, in this embodiment, the front touch sensor 16 is a multipoint sensing touch sensor capable of sensing contacts of objects at a plurality of points. Further, the front touch sensor 16 may be a sensor capable of detecting an area (contact area) of a portion over which the object is in contact with the detection surface or a strength (pressure) with which the object presses against the detection surface.

Further, in this embodiment, a rear touch sensor 18 is arranged on a rear surface side of the casing 10 so as to be opposed to the front touch sensor 16. The rear touch sensor 18 includes a substantially rectangular detection surface having a shape and a size corresponding to the detection surface of the front touch sensor 16, and detects, similarly to the front touch sensor 16, a position of an object on the detection surface. In other words, the display surface of the display 14, the detection surface of the front touch sensor 16, and the detection surface of the rear touch sensor 18 all have substantially the same shape and size, and are each arranged in a direction parallel to an XY plane of the casing 10 to be linearly aligned along the thickness direction (Z-axis direction) of the casing 10. In this embodiment, similarly to the front touch sensor 16, the rear touch sensor 18 is a multipoint sensing touch sensor capable of sensing contacts of objects at a plurality of points. Similarly to the front touch sensor 16, the rear touch sensor 18 may be of various kinds. Note that, the front touch sensor 16 and the rear touch sensor 18 are touch sensors having substantially the same shape and size as each other in this embodiment, but the two touch sensors do not necessarily need to have the same shape and size as long as the two touch sensors are arranged to be opposed to each other.

In the following description, the user provides an operation input to the information processing device 1 by bringing his/her fingers into contact with the detection surfaces of the front touch sensor 16 and the rear touch sensor 18 and moving a finger in a state in which the fingers are in contact with the detection surfaces. Note that, an action in which the user brings his/her finger into contact with one point on the detection surface and releasing the finger after moving the finger linearly in any direction on the detection surface with the contact position being a start point is hereinafter referred to as "slide operation". When the slide operation is performed, the information processing device 1 performs various kinds of information processing depending on the direction in which the user has moved his/her finger in the operation. In other words, the slide operation is an operation in which the user indicates a direction to the information processing device 1. Further, both the front touch sensor 16 and the rear touch sensor 18 are multipoint sensing touch sensors, and hence the user may provide various kinds of operation inputs by bringing a plurality of fingers of the user into contact with the touch sensors at the same time.

Note that, although not shown in FIGS. 1A and 1B, the information processing device 1 may include, in addition to the front touch sensor 16 and the rear touch sensor 18, various kinds of operation members, for example, a button or a switch, for receiving an operation input of the user on the front surface, the rear surface, the side surface, or the like of the casing 10.

Figure 2:
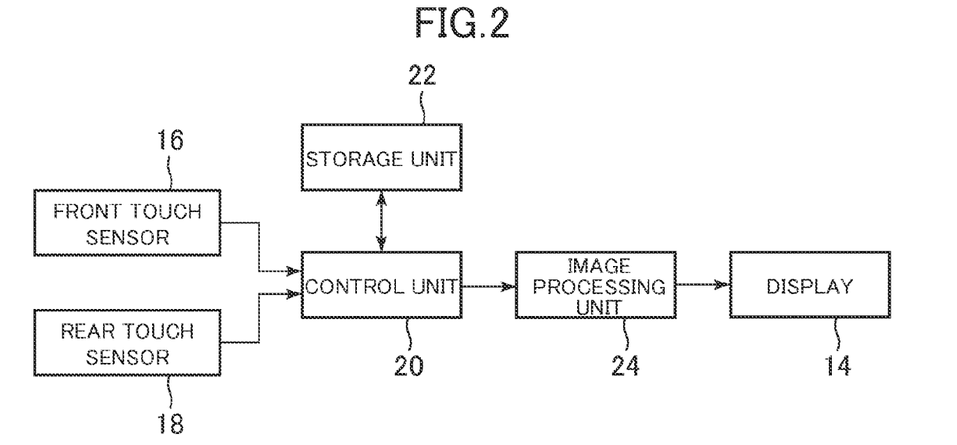
FIG. 2 A block diagram illustrating an internal configuration of the information processing device according to this embodiment.

FIG. 2 is a configuration block diagram illustrating an internal configuration of the information processing device 1. As illustrated in the figure, the information processing device 1 includes a control unit 20, a storage unit 22, and an image processing unit 24. The control unit 20 includes, for example, a CPU or the like and executes various kinds of information processing in accordance with programs stored in the storage unit 22. A specific example of processing executed by the control unit 20 will be described later. The storage unit 22 is, for example, a memory element such as a random access memory (RAM) or a read-only memory (ROM), a disk device, or the like and stores the programs executed by the control unit 20 and various kinds of data. Further, the storage unit 22 also functions as a work memory for the control unit 20.

The image processing unit 24 includes, for example, a GPU and a frame buffer memory, and renders an image to be displayed on a display 14 in accordance with an instruction output by the control unit 20. As a specific example, the image processing unit 24 includes a frame buffer memory corresponding to the display region of the display 14, and the GPU writes the image to the frame buffer memory every predetermined time in accordance with the instruction from the control unit 20. Then, the image written to the frame buffer memory is converted into a video signal at a predetermined timing, and displayed on the display 14.

Next, functions realized by the information processing device 1 in this embodiment are described. In this embodiment, the information processing device 1 uses one of the two touch sensors, that is, the front touch sensor 16 and the rear touch sensor 18, as a reference sensor and uses the other as an operation input sensor. Then, the information processing device 1 determines, based on a detected position of the object which is obtained by the reference sensor, at least one of a reference point and a reference axis of the operation input sensor, and uses the determined reference point and/or reference axis to evaluate a detection result of the operation input sensor.

The user provides an operation input by bringing, while maintaining a state in which one or a plurality of fingers of the user are in contact with the detection surface of the reference sensor, another finger into contact with the detection surface of the operation input sensor at the same time. Specifically, for example, the user provides the operation input by moving, while keeping an index finger, a middle finger, a ring finger, or the like of one hand in contact with the detection surface of the reference sensor, a thumb of the same hand on the detection surface of the operation input sensor. Alternatively, the user may provide the operation input by bringing, while keeping fingers of one hand in contact with the detection surface of the reference sensor, a finger of the other hand into contact with the detection surface of the operation input sensor. With such method, the user may provide the operation input to the operation input sensor based on a position and/or direction relative to the position of the fingers that are in contact with the reference sensor. Note that, such operation input method using the reference sensor and the operation input sensor is hereinafter referred to as "operation via the reference sensor".

Figure 3:
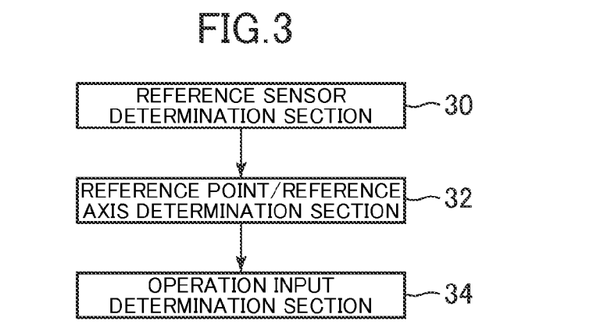
FIG. 3 A functional block diagram illustrating functions of the information processing device according to this embodiment.

The information processing device 1 according to this embodiment functionally includes, as illustrated in FIG. 3, a reference sensor determination section 30, a reference point/reference axis determination section 32, and an operation input determination section 34. Those functions are realized by the control unit 20 executing a program stored in the storage unit 22. The program may be provided, for example, while being stored in various kinds of computer readable information storage media such as an optical disc or a memory card, or may be provided to the information processing device 1 via a communication network such as the Internet.

The reference sensor determination section 30 determines, when the user performs the operation via the reference sensor, which of the two touch sensors, that is, the front touch sensor 16 and the rear touch sensor 18, is to be used as the reference sensor and which is used as the operation input sensor. As described above, when the user performs the operation via the reference sensor, the information processing device 1 receives the operation input of the user to the operation input sensor in a state in which the reference sensor senses the contact of a finger of the user. In other words, when the user provides the operation input, both the reference sensor and the operation input sensor sense the contact of fingers of the user. Therefore, the reference sensor determination section 30 may determine which of the front touch sensor 16 and the rear touch sensor 18 is to be used as the reference sensor based on the detection result thereof.

As a specific example, when one of the touch sensors detects the contact of a finger first after a state in which both of the two touch sensors do not detect the contact of fingers of the user, the reference sensor determination section 30 may determine the touch sensor that has detected the finger first as the reference sensor. Alternatively, when one of the two touch sensors detects the contact of a predetermined number of fingers or more, the touch sensor that has detected the contact of the predetermined number of fingers or more may be determined as the reference sensor. Note that, depending on the program or the like that is being executed by the information processing device 1, one of the touch sensors may be used as the reference sensor in a fixed manner. In this case, the reference sensor determination section 30 may be omitted.

The reference point/reference axis determination section 32 determines, based on one or a plurality of detected positions by the reference sensor, at least one of a reference point RP and a reference axis RA to be used as a reference in the operation via the reference sensor. Whether the reference point/reference axis determination section 32 determines only the reference point RP, only the reference axis RA, or both the reference point RP and the reference axis RA may be determined depending on the program or the like that is being executed by the information processing device 1.

In a case where the reference point/reference axis determination section 32 determines the reference point RP and the reference sensor detects only one position, the reference point/reference axis determination section 32 may directly determine positional coordinates of the detected position in the detection surface as positional coordinates of the reference point RP in the detection surface of the operation input sensor. On the other hand, in a case where the reference sensor detects a plurality of positions, the reference point/reference axis determination section 32 may determine a representative point of the plurality of detected positions (for example, a barycenter of the plurality of detected positions) as the reference point RP.

When the reference point/reference axis determination section 32 determines the reference axis RA, the reference sensor needs to detect a plurality of positions. The reference point/reference axis determination section 32 determines the reference axis RA based on the plurality of detected positions. Specifically, in a case where the reference sensor detects two positions, the reference point/reference axis determination section 32 determines a line connecting the two detected positions as the reference axis RA. On the other hand, in a case where the reference sensor detects three or more positions, for example, the reference point/reference axis determination section 32 determines a rectangle having the smallest area including all of the three or more detected positions, and determines the reference axis RA in a direction parallel to a long side of the rectangle. Alternatively, the reference point/reference axis determination section 32 may determine an ellipse having the smallest area including all of the three or more detected positions, and determine a long axis of the ellipse as the reference axis RA. Yet alternatively, the reference point/reference axis determination section 32 may determine, of the three or more detected positions detected by the reference sensor, two detected positions which are separated from each other by the longest distance, and determine a line connecting the two detected positions as the reference axis RA. Still alternatively, the reference point/reference axis determination section 32 may calculate a line approximating the three or more detected positions, and determine the line as the reference axis RA.

Further, in the case where the reference sensor detects three or more positions, the reference point/reference axis determination section 32 may determine a direction of the determined reference axis RA (that is, which direction on the reference axis RA is a positive direction) based on the detected positions. The processing for the determination will be described later.

The operation input determination section 34 determines a content of the operation input of the user by evaluating a content detected by the operation input sensor based on the reference point RP and/or the reference axis RA determined by the reference point/reference axis determination section 32. Specifically, when the reference point/reference axis determination section 32 has determined the reference point RP, the operation input determination section 34 acquires a coordinate value, which indicates the position detected by the operation input sensor as a relative position when viewed from the reference point RP, as a value indicating the content of the operation input provided by the user. On the other hand, when the reference point/reference axis determination section 32 has determined the reference axis RA and the user performs the slide operation on the operation input sensor, the operation input determination section 34 determines the direction indicated by the user by evaluating the direction in which the user has moved his/her finger as a direction relative to the reference axis RA.

Next, some specific examples of the operation via the reference sensor, which is performed by using the information processing device 1 according to this embodiment, are described.

As a first example, a method of realizing an operation input close to a so-called analog stick by using the information processing device 1 according to this embodiment is described first. For example, the information processing device 1 executes a game program to execute processing of receiving the operation via the reference sensor as described below.

Figure 4:
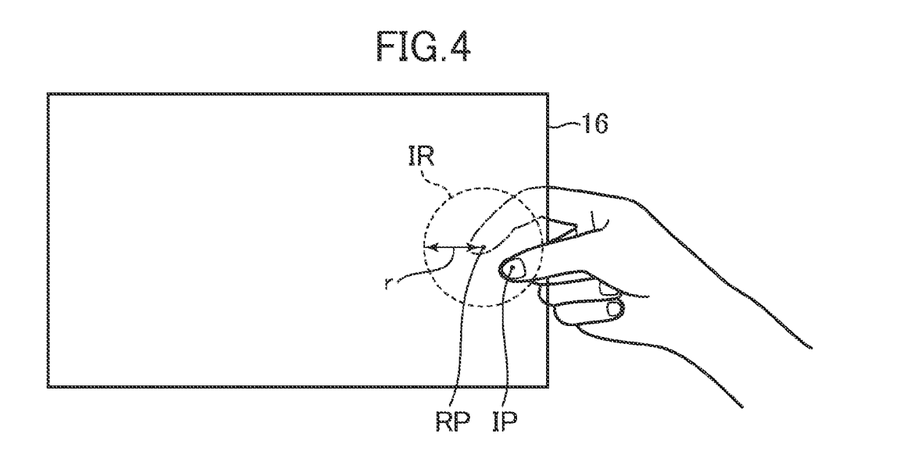
FIG. 4 An explanatory diagram illustrating a first example of an operation via a reference sensor.

In the first example, the rear touch sensor 18 serves as the reference sensor, and the front touch sensor 16 serves as the operation input sensor. The user maintains a state in which, while holding the casing 10 of the information processing device 1 with one hand, one finger (for example, index finger) of the hand is in contact with an arbitrary position of the rear touch sensor 18. At this time, the reference point/reference axis determination section 32 determines a position in the detection surface of the front touch sensor 16, which corresponds to the position of the index finger of the user detected by the rear touch sensor 18, as the reference point RP.

In this state, the user provides an operation input in which the user moves his/her finger (for example, thumb) in an input range IR set in a part of the detection surface of the front touch sensor 16. The input range IR is a circular region having a predetermined radius r around the reference point RP in the detection surface of the operation input sensor. FIG. 4 is an explanatory diagram illustrating the first example of the operation via the reference sensor, and illustrates how the user provides the operation input by moving the thumb in the input range IR while specifying the position of the reference point RP with the index finger.

At this time, the operation input determination section 34 uses the positional coordinates of the reference point RP to calculate relative coordinates of the detected position (hereinafter referred to as input position IP), which is detected by the front touch sensor 16, with respect to the reference point RP. For example, when absolute positional coordinates of the reference point RP are expressed by $(x_r, y_r)$ and absolute positional coordinates of the input position IP are expressed by $(x_i, y_i)$, the relative coordinates are expressed by $(x_i-x_r, y_i-y_r)$. The operation input determination section 34 outputs the coordinate value as a value indicating the content of the operation input of the user to the game program. Alternatively, the operation input determination section 34 may calculate, based on the positional coordinates of the reference point RP and the input position IP, a distance between the two points and an angle indicating the direction of the input position IP when viewed from the reference point RP, and output the values of the distance and the angle as values indicating the content of the operation input of the user.

According to the first example, it is possible to realize an operation input in which the user specifies an arbitrary direction of 360° by moving a finger on the detection surface of the front touch sensor 16 around the reference point RP as if the user performs an operation of inclining an analog stick. Further, the reference point RP is at the position opposed to the position at which the user keeps his/her finger in contact with the detection surface of the rear touch sensor 18, and hence where in the detection surface of the front touch sensor 16 is to be set as the reference point RP may be determined by the user at will. In other words, the user may set a position at which the user may easily provide the operation input as the reference point RP depending on the easiness to hold the casing 10 or a display content of the display 14.

Note that, in the above description, the direction of the input position IP when viewed from the reference point RP is evaluated by using the X axis and the Y axis that are previously set in the casing 10 of the information processing device 1 as the reference axes. However, when the user maintains a state in which a plurality of fingers are in contact with the reference sensor, the reference point/reference axis determination section 32 may determine not only the reference point RP but also the reference axis RA based on the positions of the fingers, and the operation input determination section 34 may evaluate the content of the operation input of the user based on both the reference point RP and the reference axis RA. In this case, for example, the operation input determination section 34 may calculate relative positional coordinates of a position, which is obtained by reversely rotating the input position IP around the reference point RP by an angle corresponding to an inclination of the reference axis RA with respect to the X axis (or the Y axis), as a value indicating the content of the operation input provided by the user.

Further, in the first example, the user performs the operation via the reference sensor while looking at the display 14. Therefore, in order to allow the user to easily understand where in the detection surface of the operation input sensor the reference point RP and the input range IR are set while the execution of the operation via the reference sensor, the information processing device 1 may display images of markers or the like indicating the reference point RP and the input range IR at positions corresponding to the reference point RP and the input range IR in the display surface of the display 14.

Next, as a second example, a method of enabling the user to provide an operation input of indicating a direction without directly confirming the casing 10 of the information processing device 1 with his/her eyes is described. As a specific example, processing of receiving the operation via the reference sensor in a case where the information processing device 1 executes an audio reproduction program for reproducing audio data such as a tune to function as a music player is described below. In this example, the user may provide the operation input of indicating a desired direction even when the user cannot recognize which side the front surface or the rear surface of the casing 10 faces or which side the right direction or the up direction (that is, positive X-axis direction or positive Y-axis direction) of the detection surface faces in a state in which the information processing device 1 is left in a pocket of clothes or a bag.

In the second example, it is desired that any one of the front touch sensor 16 and the rear touch sensor 18 may function as the reference sensor depending on the way the user holds the casing 10. Therefore, for example, when a predetermined number of (for example, three) fingers or more of the user are brought into contact with one of the touch sensors during execution of audio reproduction processing, the reference sensor determination section 30 determines the touch sensor as the reference sensor. In this manner, the user may provide the operation input by using one of the touch sensors as the reference sensor even in the state in which the user cannot recognize which side of the information processing device 1 is the front surface and which side is the rear surface.

When the reference sensor determination section 30 determines the reference sensor, the reference point/reference axis determination section 32 subsequently determines the reference axis RA based on the detected positions of the reference sensor. In the second example, the user maintains the state in which three or more fingers are in contact with the reference sensor. In this case, as described above, the inclination of the reference axis RA is calculated based on the positional coordinates of the three or more positions detected by the reference sensor. Further, in the second example, the reference point/reference axis determination section 32 determines not only the inclination of the reference axis RA with respect to the detection surface but also which side of the reference axis RA is a positive direction and which side is a negative direction based on the detected positions of the reference sensor.

Figure 5A:
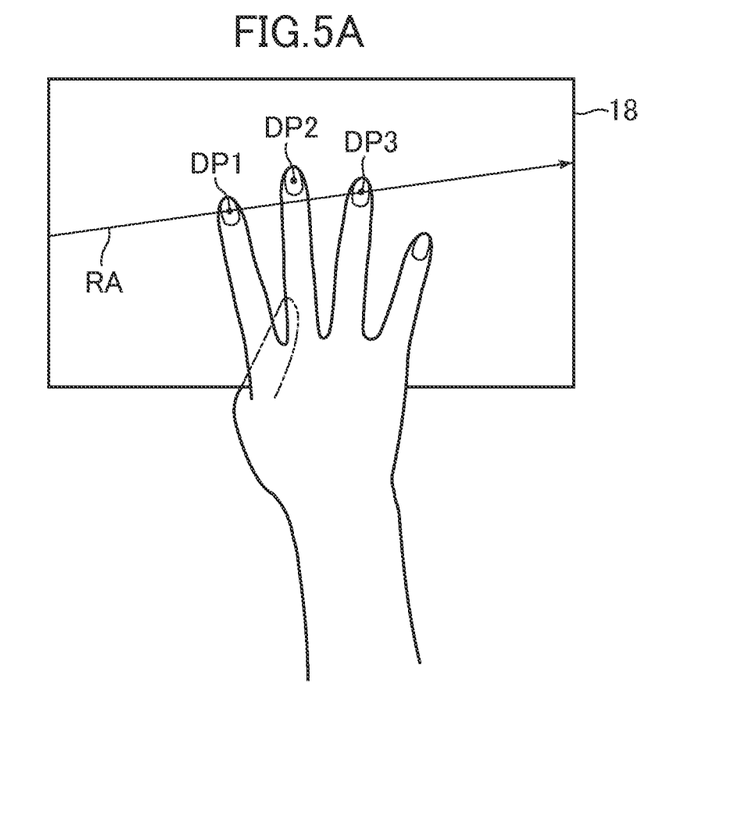
FIG. 5A An explanatory diagram illustrating a second example of the operation via the reference sensor.
Figure 5B:
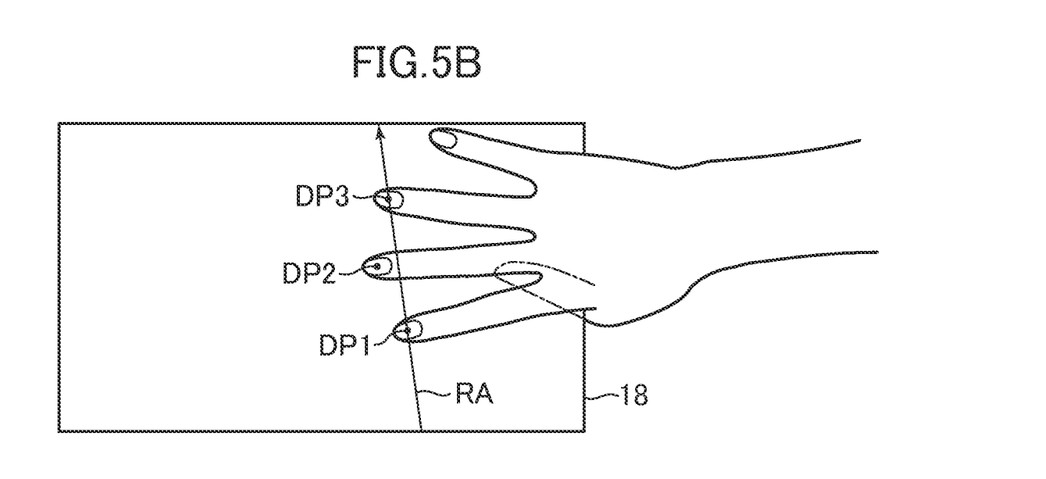
FIG. 5B An explanatory diagram illustrating the second example of the operation via the reference sensor.

FIGS. 5A and 5B are diagrams each illustrating an example of a method of determining positive and negative directions of the reference axis RA, and illustrates a relationship of the detection result of the reference sensor (which is assumed here as the rear touch sensor 18) and the reference axis RA. In the figures, there is expected a case where the user brings three fingers, that is, the index finger, the middle finger, and the ring finger of one hand into contact with the reference sensor, and contact positions of the fingers are denoted by three detected positions DP1 to DP3 in the detection surface of the reference sensor. The reference point/reference axis determination section 32 determines the positive direction of the reference axis RA depending on, of the plurality of detected positions DP of the reference sensor, which side of a line connecting the detected positions DP (in FIGS. 5A and 5B, detected positions DP1 and DP3) at both sides the detected position DP (in FIGS. 5A and 5B, detected position DP2) at the center when viewed along the reference axis RA is located. More specifically, in both the examples of FIGS. 5A and 5B, the right direction when viewed in the direction in which the detected position DP2 at the center protrudes with respect to the detected positions DP1 and DP3 at both sides is determined as the positive direction of the reference axis RA. Note that, in FIGS. 5A and 5B, the positive direction of the reference axis RA is denoted by the arrow. Similarly, in a case where the reference sensor detects four or more positions, a parabola approximating the detected positions may be determined, and the positive direction and the negative direction of the reference axis RA may be determined depending on which side the curve of the parabola is pointed when viewed from the reference axis RA. Usually, when the user brings a plurality of fingers of one hand into contact with the reference sensor, the contact positions of the fingers are expected to be arranged in a parabola pointing to a side opposite to the palm. Therefore, by determining the positive and negative directions of the reference axis RA depending on the direction of the parabola approximating the detected positions of the reference sensor as described above, the same direction with respect to the user's palm may always be determined as the positive direction of the reference axis RA regardless of the direction in which the user holds the casing 10.

Once the inclination and the positive and negative directions of the reference axis RA are determined, the operation input determination section 34 receives an operation input of the user to the operation input sensor, and evaluates a content of the operation input based on the inclination and the positive and negative directions of the reference axis RA. In this case, as a specific example, the user performs a slide operation toward an arbitrary direction on the operation input sensor. The operation input determination section 34 determines which of the positive direction and the negative direction of the reference axis RA the direction of the slide operation is closer to, and outputs a result of the determination to the audio reproduction program. The audio reproduction program executes, for example, processing of increasing or decreasing the volume of the audio reproduction or processing of switching the tune that is being reproduced depending on which of the positive and negative directions of the reference axis RA the direction of the slide operation performed by the user corresponds to.

According to the second example, the inclination and the positive and negative directions of the reference axis RA are determined based on the detected positions of the reference sensor, and hence the user may provide the operation input of indicating a direction to the operation input sensor by bringing his/her fingers into contact with the reference sensor so that the direction in which the user may easily perform the operation is determined as the reference axis RA regardless of the direction of the casing 10. Therefore, for example, with the information processing device 1 being left in a pocket or the like, the user may provide the operation input of indicating the direction without directly confirming the direction of the information processing device 1 with the user's eyes. Further, even when the user operates the information processing device 1 by looking at the information processing device 1 directly with the user's eyes, the user may provide the operation input of indicating the direction while holding the information processing device 1 in an arbitrary direction without bothering to change the way the user holds the information processing device 1.

Note that, in the above description, the direction of the slide operation is evaluated as one of the positive direction and the negative direction of the reference axis RA. However, the present invention is not limited thereto, and the slide operation along a direction orthogonal to the reference axis RA may be received. In this case, the user may perform an operation of indicating four directions of up, down, left, and right with, for example, the positive direction of the reference axis RA being the left direction. Further, in the above description, the positive and negative directions of the reference axis RA are determined based on the detection result at three or more points from the reference sensor, but the reference point/reference axis determination section 32 does not necessarily need to determine the positive and negative directions of the reference axis RA. In this case, for example, the user may provide an operation input to the information processing device 1 by selectively using the two kinds of operations: the slide operation in a direction parallel to the reference axis RA; and the slide operation in a direction orthogonal to the reference axis RA. Alternatively, the reference point/reference axis determination section 32 may determine the direction of the reference axis RA by, for example, determining a direction closer to the positive X-axis direction of the casing 10 as the positive direction or other such methods. In this manner, even when the reference sensor may detect only two detected positions, the positive direction of the reference axis RA may be determined.

Yet alternatively, the reference point/reference axis determination section 32 may determine the positive direction and the negative direction of the reference axis RA by using a posture detection sensor mounted in the casing 10. For example, in a case where a sensor capable of detecting a direction of the acceleration of gravity, such as a three-axis acceleration sensor, is mounted in the casing 10, the reference point/reference axis determination section 32 can determine which direction the casing 10 faces with respect to the vertical direction when the operation via the reference sensor is performed. Then, the reference point/reference axis determination section 32 may determine the positive and negative directions of the reference axis RA depending on the relationship between the direction of the casing 10 and the vertical direction. As a specific example, the reference point/reference axis determination section 32 may determine as the positive direction a direction of the reference axis RA closer to the positive X-axis direction when the vertical direction is closer to the negative Y-axis direction, and may determine as the positive direction a direction of the reference axis RA closer to the negative X-axis direction when the vertical direction is closer to the positive Y-axis direction. Then, the user may indicate the left and right directions with the direction closer to the ground being the down direction. Still alternatively, the reference point/reference axis determination section 32 may determine a direction closer to the vertical direction of the reference axis RA as the negative direction. Then, the user may indicate the up and down directions with the direction being closer to the ground being the down direction regardless of the direction of the casing 10.

The information processing device 1 according to this embodiment may execute the operation input not only by the operation via the reference sensor, which uses the reference sensor and the operation input sensor as described above, but also by usual absolute coordinates. Switching between such operation modes is described below. Note that, a state in which the usual operation input by the absolute coordinates is received is hereinafter referred to as "usual input state", and a state in which the operation via the reference sensor is received (that is, a state in which the detection result of the operation input sensor is evaluated not as the absolute coordinates but as a value relative to the reference point RP or the reference axis RA) is hereinafter referred to as "reference input state".

For example, in order to avoid an erroneous operation while the information processing device 1 is kept in a bag or the like, the information processing device 1 may have a function capable of transitioning to a state in which an operation input by a usual method is restricted (such as key lock state). Specifically, for example, the information processing device 1 includes a switch for transitioning to such operation input restricted state on the surface of the casing 10, and the user operates the switch to cause the information processing device 1 to transition to the operation input restricted state. Then, the information processing device 1 may receive only the operation via the reference sensor even in the operation input restricted state. In this case, the information processing device 1 transitions to the operation input restricted state as well as to the reference input state, and returns to the usual input state at timing when the operation input restricted state is released.

Further, in the case where the user is expected to perform the operation via the reference sensor in a pocket or a bag as in the second example described above, it is preferred that the information processing device 1 automatically transition to the reference input state when the information processing device 1 is in a pocket or a bag. Therefore, the information processing device 1 may use a brightness sensor, which is capable of detecting the brightness of the surrounding environment, to determine whether or not to transition to the reference input state. In this case, the information processing device 1 includes the brightness sensor on the front surface or the like of the casing 10 to regularly determine whether or not the detection result has fallen below a predetermined threshold value. Then, the information processing device 1 transitions to the reference input state when determining that the detection result has fallen below the predetermined threshold value, and returns to the usual input state again when the detection result of the brightness sensor is equal to or more than the predetermined threshold value.

Alternatively, the information processing device 1 may transition to the reference input state based on the detection result of at least one of the front touch sensor 16 and the rear touch sensor 18. For example, when the operation via the reference sensor is to be performed, the user needs to bring fingers into contact with both the two touch sensors. Therefore, the information processing device 1 may transition to the reference input state when both the front touch sensor 16 and the rear touch sensor 18 detect the contact of the fingers of the user at the same time. Further, when the reference point/reference axis determination section 32 determines the reference axis RA and the positive and negative directions thereof as in the second example described above, one of the touch sensors needs to detect the contact of three or more fingers. Therefore, the information processing device 1 may transition to the reference input state when one of the touch sensors detects three or more positions. Further, without limiting to the above-mentioned conditions, the information processing device 1 may transition to the reference input state when the detection results of the front touch sensor 16 and the rear touch sensor 18 satisfy a predetermined condition.

Note that, when transitioning to the reference input state depending on the detection results of the brightness sensor or the touch sensors as described above, in order to avoid an erroneous operation, the information processing device 1 may transition to the reference input state not immediately after it is determined that the detection results of the sensors satisfy the condition, but when a state in which the condition is satisfied has continued for a predetermined period of time or longer. Further, in order to notify the user of the transition to the reference input state, the information processing device 1 may inform the user by outputting a sound from a speaker, vibrate the casing 10 by operating a built-in motor, or display a predetermined image (such as icon image) on the display 14.

According to the information processing device 1 of this embodiment described above, the user may provide the operation input on the detection surface of the operation input sensor at a desired position or in a desired direction regardless of the direction or the posture of the casing 10 by providing the operation input to the operation input sensor arranged to be opposed to the reference sensor while keeping his/her fingers or the like in contact with the detection surface of the reference sensor to specify the reference point RP and/or the reference axis RA.

Note that, the embodiment of the present invention is not limited to that described above. For example, the method of determining the reference point RP or the reference axis RA described above is merely an example, and the information processing device 1 may determine the reference point RP or the reference axis RA based on the detection result of the reference sensor by another method. Further, in addition to the first and second examples described above, the information processing device 1 may realize the various kinds of information processing by receiving from the user an input of a position or direction relative to the reference point RP or the reference axis RA.

Further, in the above description, the front touch sensor 16 and the rear touch sensor 18 are included in the casing 10 of the information processing device 1, but the operation device including the front touch sensor 16 and the rear touch sensor 18 may be prepared separately from the information processing device 1. As a specific example, the information processing device 1 may be a consumer game machine or a personal computer, and the operation device including the two mutually opposed touch sensors may be communicably connected via wire or wirelessly to the information processing device 1. In this case, the operation device transmits the detection results of the touch sensors to the information processing device 1, and the information processing device 1 may use the detection results to execute processing similar to that described above.

The invention claimed is:

1. An information processing device having a processor, comprising:
    two touch sensors each including a detection surface for detecting a position of an object thereon, the two touch sensors being arranged to be opposed to each other;
    wherein the processor determines a reference point and a reference axis based on one or a plurality of positions detected by one touch sensor of the two touch sensors; and
    the processor evaluates a content detected by another touch sensor of the two touch sensors based the reference point and the reference axis to determine a content of an operation input of a user,
    wherein the processor determines the reference axis, a direction of the reference axis, and positive and negative directions along the reference axis using three or more positions detected by the one touch sensor, and wherein the processor determines a direction indicated by the user as a direction relative to the positive and negative directions along the reference axis from the content detected by the another touch sensor,
    wherein the processor determines a rectangle having a smallest area including all of the three or more detected positions, and determines the reference axis in a direction parallel to a long side of the rectangle.

2. The information processing device according to claim 1, wherein the processor determines one of the two touch sensors as a reference sensor to be used in determining the at least one of the reference point and the reference axis, wherein the processor determines the at least one of the reference point and the reference axis based on a plurality of positions detected by the reference sensor.

3. The information processing device according to claim 1, wherein the processor determines a transition to an operation input state using a reference sensor based on a detection result of at least one of the two touch sensors, wherein the processor determines the reference point and the reference axis in the operation input state using the reference sensor, and wherein the processor evaluates, in the operation input state using the reference sensor, the content detected by the another touch sensor based on the reference point and the reference axis.

4. An information processing device having a processor, comprising:
    two touch sensors each including a detection surface for detecting a position of an object thereon, the two touch sensors being arranged to be opposed to each other;
    wherein the processor determines a reference point and a reference axis based on one or a plurality of positions detected by one touch sensor of the two touch sensors; and
    the processor evaluates a content detected by another touch sensor of the two touch sensors based the reference point and the reference axis to determine a content of an operation input of a user,
    wherein the processor determines the reference axis, a direction of the reference axis, and positive and negative directions along the reference axis using three or more positions detected by the one touch sensor, and wherein the processor determines a direction indicated by the user as a direction relative to the positive and negative directions along the reference axis from the content detected by the another touch sensor,
    wherein the processor determines an ellipse having a smallest area including all of the three or more detected positions, and determines a long axis of the ellipse as the reference axis.

5. An information processing device having a processor, comprising:
    two touch sensors each including a detection surface for detecting a position of an object thereon, the two touch sensors being arranged to be opposed to each other;
    wherein the processor determines a reference point and a reference axis based on one or a plurality of positions detected by one touch sensor of the two touch sensors; and
    the processor evaluates a content detected by another touch sensor of the two touch sensors based the reference point and the reference axis to determine a content of an operation input of a user,
    wherein the processor determines the reference axis, a direction of the reference axis, and positive and negative directions along the reference axis using three or more positions detected by the one touch sensor, and wherein the processor determines a direction indicated by the user as a direction relative to the positive and negative directions along the reference axis from the content detected by the another touch sensor,
    wherein the processor determines, of the three or more detected positions, two detected positions which are separated from each other by a longest distance, and determines a line connecting the two detected positions as the reference axis.

6. An information processing device having a processor, comprising:
    two touch sensors each including a detection surface for detecting a position of an object thereon, the two touch sensors being arranged to be opposed to each other;
    wherein the processor determines a reference point and a reference axis based on one or a plurality of positions detected by one touch sensor of the two touch sensors; and
    the processor evaluates a content detected by another touch sensor of the two touch sensors based the reference point and the reference axis to determine a content of an operation input of a user, wherein the processor determines the reference axis, a direction of the reference axis, and positive and negative directions along the reference axis using three or more positions detected by the one touch sensor, and wherein the processor determines a direction indicated by the user as a direction relative to the positive and negative directions along the reference axis from the content detected by the another touch sensor, wherein the processor calculates a line approximating the three or more detected positions, and determines the line as the reference axis.

7. An information processing device having a processor, comprising:

two touch sensors each including a detection surface for detecting a position of an object thereon, the two touch sensors being arranged to be opposed to each other;

wherein the processor determines a reference point and a reference axis based on one or a plurality of positions detected by one touch sensor of the two touch sensors; and the processor evaluates a content detected by another touch sensor of the two touch sensors based the reference point and the reference axis to determine a content of an operation input of a user, wherein the processor determines the reference axis, a direction of the reference axis, and positive and negative directions along the reference axis using three or more positions detected by the one touch sensor, and wherein the processor determines a direction indicated by the user as a direction relative to the positive and negative directions along the reference axis from the content detected by the another touch sensor, wherein the processor determines the positive and negative directions of the reference axis using a posture detection sensor mounted in the information processing device.

* * * * *